May 1, 1962     A. A. ZUEHLKE ETAL     3,032,733

UNIVERSAL PRESSURE TRANSDUCER

Filed Aug. 23, 1961

INVENTORS.
ARTHUR A. ZUEHLKE
MARLAN E. BOURNS
BY

United States Patent Office 3,032,733
Patented May 1, 1962

3,032,733
UNIVERSAL PRESSURE TRANSDUCER
Arthur A. Zuehlke and Marlan E. Bourns, Riverside, Calif., assignors to Bourns, Inc., a corporation
Filed Aug. 23, 1961, Ser. No. 133,515
12 Claims. (Cl. 338—41)

The invention hereinafter described and explained pertains to instruments useful in translating pressures exhibited by fluids, or changes of such pressures, into electrical indications or signals representative of the respective pressures or pressure changes. More particularly the invention pertains to instruments of the class commonly called pressure transducers and which instruments are of the electromechanical type.

Prior art pressure-indicating instruments and pressure transducers useful in indicating with good resolution small changes of pressure exerted by a fluid, have utilized various means for amplifying or multiplying the expansion or contractive movements of a pressure-sensitive element, whereby a more extensive movement of an indicator hand or the like was produced incident to the relatively small movement of the sensor element. Sensor elements such as diaphragms, diaphragm-cells, resilient bellows, and Bourdon tubes are used in instruments of the class under discussion. The prior-art instruments suffer shortcomings, among which are: (a) lost-motion in link-and-pin or other articulated connections between the sensor element and the indicating element, resulting in inaccuracy of the indication provided, (b) relatively short life due to frictional wear between relatively movable contacting parts such as pivots, pinions, etc., (c) lack of means for easily changing the ratio between the movements of the sensor element and the consequent movements of the indicator element during normal use of the instrument, and (d) a lack of ruggedness in the interconnected linkages or parts.

The present invention provides an instrument useful in indicating either absolute pressure, differential pressure, of gage pressure, without any of the aforementioned shortcomings of prior art devices. Those accomplishments are attained by utilizing one or more expansible and contractile cells or a bellows, for example, as a sensor element sensitive to differences in pressures exhibited between a contained fluid and an ambient or surrounding fluid; and by utilizing a unique motion-multiplying device having no frictional joints and having provisions for easily changing the ratio of multiplication of sensor-element movement. The multiplying device consists essentially of two elongate spring members arranged in somewhat divergent relationship as viewed toward relatively free ends from the opposite ends of the members which are rigidly interconnected by suitable means such as a bridge means that forms part of the device and which may in fact be integral with the two spring members. The free end of a first spring member or limb of the device is arranged for generally longitudinal movement by the sensor, while the free end of the second limb or spring member is anchored against appreciable longitudinal movement; whereby the bridged ends of the limbs are displaced laterally in a substantially arcuate path incident to movement of the sensor element. The ratio of sensor element movement to bridge means movement is dependent upon the lengths of the limbs, and their separation adjacent their free ends. Thus by moving the free ends closer together the multiplication factor is increased, and vice versa. Alteration of the distance separating the free ends is effected by suitable means such as a second bellows that is connected to be actuated by pressure applied to a control fluid. The range of movement amplification that may be accommodated is governed principally by the lengths of the free portions and the total length of the limbs, but the amplification can be increased by providing an extension of the bridge member so as to increase the radius of the transversely or arcuately moved member. Translation of the latter movement to an electrical indication is by suitable cooperating relatively movable electrical signal elements one of which is moved by the bridge member and the other of which is fixed relative to a casing in which the operating parts are housed.

The preceding brief general exposition of the invention makes it apparent that a principal object of the invention is to provide improvements in pressure transducers.

Another object of the invention is to provide a pressure transducer that is characterized by excellent resolution while indicating changes of pressure of very small magnitude.

Another object of the invention is to provide a pressure transducer having a motion multiplying means whose amplification ratio can be adjusted without manual access to the interior of the instrument.

Another object of the invention is to provide a pressure transducer having improved longevity due to the absence of frictional joints between moving parts.

Other objects of the invention, and the advantages thereof, will be made apparent in the appended claims and the following description of an exemplary preferred embodiment of the invention, as illustrated in the accompanying drawings. In the drawings:

Figure 1:
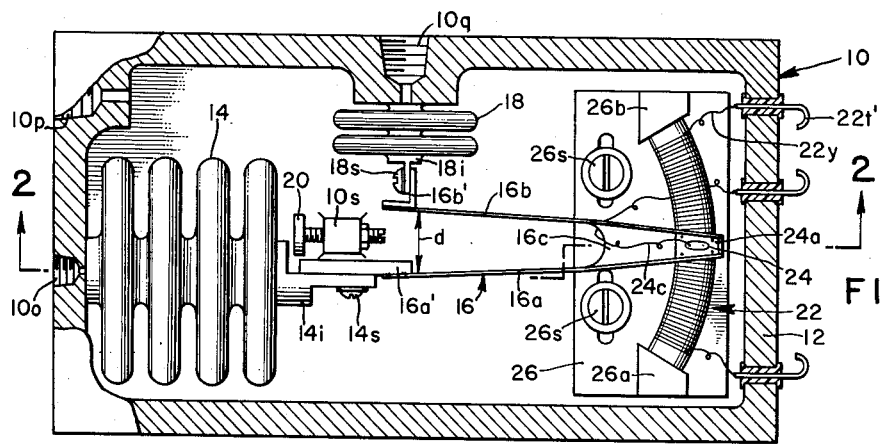
FIG. 1 is a plan view of an instrument, with parts of the instrument casing broken away to reveal details.

The instrument, indicated generally by ordinal 10 and hereinafter termed a pressure transducer, comprises operating parts that are preferably, and in some cases necessarily, sealed in a hermetic housing or casing that conveniently may serve as a frame means supporting the operating parts. The casing, 12, is herein illustrated as comprising an upper shell 12a and a lower shell 12b that are fusion-united as by welding along a weld line as indicated, following assembly of the operating parts of the instrument. Secured to one inner end-wall of the casing as by brazing, is a resilient pressure-sensor element 14 capable of expansion and contraction incident to changes in the difference between the pressure inside the sensor element and that outside the sensor element. The interior of the sensor element, which element is hereinafter termed the cell, is arranged to be in communication with a means for supplying thereto fluid whose pressure is of interest. For that purpose the inlet bore 14b (FIG. 3) of cell 14 is aligned with a companion bore formed through the end wall of the casing 10 at the bottom of a tapped opening 10o that is adapted to receive a plug or a conduit fitting (not shown). The cell 14 may be of other types, as will be evident to those skilled in the art.

Casing 12 is further provided with a second tapped opening, 10p, adapted to receive, alternatively, a plug or a conduit fitting. The arrangement thus is such that cell 14 may be adapted to sense (1) absolute pressure if either the cell or the chamber within casing 10 is evacuated and the other is connected to the source of fluid whose pressure is to be sensed, or (2) gage pressure, if either of the openings is left open to the ambient and the other is connected to the fluid, or (3) the difference between pressures exhibited by separate bodies of fluids each contained in a separate vessel each of which is connected to a respective one of the openings. As is also evident, the instrument may be restricted to indication of change of pressure exhibited by a fluid admitted to cell 14, relative to that of a fluid sealed in the casing by a plug sealed in opening 10p. Thus the sensor element 14 may be used in the several known ways to sense pressures exhibited in different ways, and to indicate the magnitude or change of pressure relative to a standard or predetermined value by the extent of movement or displacement of its free or inner end-piece 14i, as may be well understood in the art.

Translation of movements of the free end 14i of cell 14, which moves in or along a predetermined path, into movements of greater amplitude by another member, is accomplished by a motion or displacement amplifier that will for convenience be herein termed a multiplier device. The multiplier device, indicated generally by ordinal 16, comprises a pair of resilient elongate spring members or limbs 16a and 16b (here shown in the form of flat leaf-springs) that are rigidly interconnected at their convergent ends by a bridge means 16c. The bridge means forms the output means or end of the device. In the illustrated embodiment of the invention the bridge means is conveniently formed as an integral connecting web. As indicated in FIG. 1, limbs 16a and 16b are divergent away from the web or bridge means 16c. The non-connected or divergent end (herein termed the free end) of limb 16a comprises attachment means in the form of a plate 16a' to which the spring proper is secured by spot welding or adhesive; whereby the limb may be adjustably connected to a movable free end means here shown as an end-piece 14i of cell 14 so as to be longitudinally displaced as the cell expands or contracts. The divergent or free end of limb 16a is the input means or end of the multiplier device. The adjustable connection is effected by a lock-screw 14s that extends through a slot in an extension of end piece 14i (FIG. 2) and is turned into a complementary tapped hole in plate 16a'. By that connection the free end of limb 16a is substantially longitudinally or rectilinearly displaced synchronously with the free end of cell 14.

Figure 3:
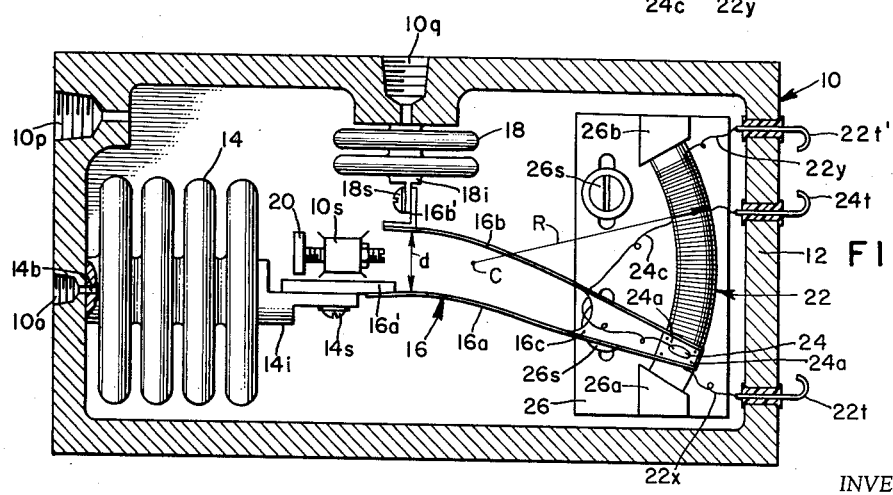
FIG. 3 is a view similar to FIG. 1, but illustrating operating parts in different positions.

The free end of limb 16b of the multiplier is constructed and arranged to be restrained against longitudinal movement of consequence, and to be held at an adjustable desired distance d from the free end of limb 16a, by being secured through fastening or attachment means to a divergent or free end portion of an expansible cell or bellows 18 (FIGS. 1 and 3). Cell 18 is affixed to the inner wall of casing 10, as by brazing. There is affixed to the spring proper of the limb a bracket 16b', as by spot welding; and the bracket is secured to the free end-part 18i of cell 18 by screw means 18s. It is evident that the distance d separating the two limbs may be adjusted by causing expansion or contraction of cell 18. That is accomplished by admitting fluid under pressure into (or withdrawing fluid from) cell 18, by and through means (not shown) connected to a tapped opening 10q formed in the wall of casing 10, and with which opening the bore of cell 18 communicates.

As limb 16b of the multiplier device is prevented from longitudinal movement or displacement at its divergent end, displacement of the divergent or free end of limb 16a causes or induces lateral flexing of both limbs and amplified lateral displacement of the bridge 16c, which forms an output means for the motion-multiplying device. The lateral flexing of the limbs is depicted in FIG. 3, which illustrates the resultant action when cell 14 contracts due to a change in the pressure exerted within and/or outside the cell. It is evident that upon expansion of cell 14, bridge means 16c would be moved laterally in the opposite direction. The movement of the bridge means 16c is actually more nearly an arcuate movement about a slightly shifting center located between limbs 16a and 16b. Such a center is indicated by C in FIG. 3; and as there indicated the convergent end of the bridge moves substantially along an arcuate path of radius R. Also it is noted that the movement-amplification factor of the multiplier device is proportional to $R/d$, from which it is evident that amplification of movement or displacement sensed by the device 16 at 14i is decreased when the distance between the limbs ($d$) is increased, and vice versa.

The dimensions, spring constants, and other design criteria of cells 14 and 18 may be selected in accord with known principles of design, to accommodate the instrument to specified ranges of pressures. In general, cell 18 is relatively stiff and not laterally flexible; and cell 14 is such as to accommodate the full range of pressure-difference contemplated, while displacing end-piece 14i through a range permitted by the maximum swing of bridge means 16c. Excessive expansion of cell 14 may be, and preferably is, prevented by an adjustable stop-screw 20 that is adjustably mounted in a pedestal 10s formed as part of casing 10.

Figure 2:
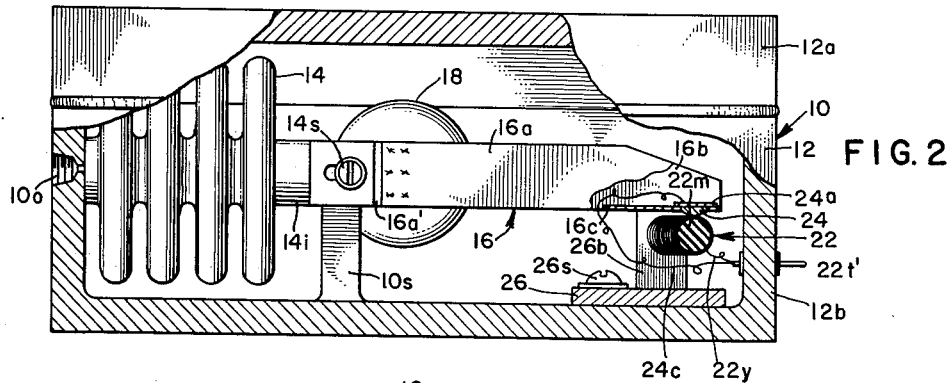
FIG. 2 is a view of the instrument, partially in section taken as indicated by line 2—2 in FIG. 1.

The electrical indication of the extent of arcuate movement of the bridge means 16c (and hence also of the pressure-change sensed by cell 14), is provided by cooperative interaction of first and second relatively movable electrical signaling means that in the exemplary embodiment illustrated comprise a relatively fixed potentiometer resistance element 22 and a potentiometer contact 24. Resistance element 22 comprises a winding of spaced turns of resistance wire formed on an insulative support or mandrel 22m that is rigidly mounted in posts 26a, 26b formed as parts of a stand 26 that is adjustably secured to the bottom or floor of casing 10 by screws 26s as indicated. Contact 24 is secured (as by adhesive) to an insulative plate 24a that is secured over an opening in the web of bridge means by rivets, the arrangement being such that the contact wipes or brushes the resistance element as indicated in FIG. 2, and is insulated from device 16. As indicated in FIG. 3, contact 24 is connected by way of an insulated flexible lead 24c to a sealed lead-through terminal 24t; and end portions of the resistance element are connected by respective insulated leads 22x and 22y to similar sealed lead-through terminals 22t, 22t'.

It is evident that with a source of potential connected across terminals 22t and 22t', the potential exhibited between either of those terminals and contact terminal 24t will vary with variations in the position of the contact along the resistance element and will thus provide a signal representative of the displacement of end-piece 14i of cell 14 and of the difference between the internal and external pressures effective on cell 14. By means of the several adjusting means, the base or "zero" signal may be set as desired. Further, the ratio of the amplification of movement by the device 16 may be adjusted by changing the pressure exerted by fluid introduced into cell 18, or, alternatively, a mathematical function may be effectively introduced into the multiplication operation of device 16 by suitably varying the pressure exerted by the fluid in cell 18.

The preceding description of a preferred embodiment of apparatus according to the invention makes it evident that pressure-representing displacements of end-piece 14i are by the instrument transduced or translated into electric signals representative of the pressure differences sensed by cell 14, and that the translation is effected without lost motion. Also it is evident that, because of the multiplying effect of device 16, very small displacements of end-piece 14i representing very small changes of pressure, are without loss amplified to cause appreciable movement of contact over the resistance element 22, thus providing good resolution over very small ranges of pressure-changes. Thus the disclosed instrument fully meets all the aforementioned objects of the invention.

It also is evident that with the preceding disclosure in view, changes and modifications within the spirit and scope of the invention will occur to others; and accordingly we do not wish to limit the invention to the exact details of the exemplary instrument, but we claim:

1. An adjustable pressure transducer comprising:
    first means, comprising frame means, arranged to serve as a support for other means;

second means, comprising an elastic pressure-sensor cell affixed to said frame means and constructed and arranged to be subjected to the pressures exhibited by different fluids to which its interior and exterior may be respectively subjected, and having an end means arranged to be displaced relative to said frame means along a predetermined path in response to changes in the ratio of said pressures;

third means constructed and arranged to amplify displacements of said end means relative to said frame means along said path, comprising a device having first and second elongate spring limbs interconnected adjacent convergent end portions thereof by connecting means and having divergent end portions, the divergent end portion of a first of said limbs being rigidly connected to said end means for displacement thereby in the direction of said path and the divergent end portion of the second of said limbs being restrained against substantial movement in the direction of said path by attachment means supported by said first means; and fourth means, including movable-element means secured to said connecting means and cooperating stationary-element means secured to said first means, for translating movements of said connecting means to physical indications of the extents of displacement of said end means, whereby the said physical indication is an accurate representation to an amplified scale of the differences of pressures sensed by said cell.

2. A transducer according to claim 1, said attachment means comprising variable means for varying the spacing between the divergent ends of said first and second elongate spring limbs, whereby the extent of amplification of said third means may be varied.

3. A transducer according to claim 2, said variable means comprising a second pressure-sensor means constructed and arranged for displacement of an end part thereof, said end part being connected to the divergent end portion of said second limb.

4. A transducer according to claim 1, said first and second elongate spring limbs comprising flat leaf-spring portions.

5. A transducer according to claim 1, said fourth means comprising a potentiometer and said movable-element means comprising the movable contact of the potentiometer and said stationary-element means comprising the resistance element of the potentiometer.

6. A pressure transducer comprising:
first means, comprising sealed casing means, providing a chamber for containing operating instrumentalities of the transducer;
second means, comprising an elastic variable-volume cell in said chamber and having an exposed exterior surface and an exposed interior surface sealed from said exterior surface, and means for passing fluid under pressure to and from at least one of said surfaces whereby to change the volume of said cell and displace a movable piece thereof along a predetermined path;
third means, comprising positive displacement-amplifying means having an input means positively connected to said movable piece of said cell and having an output means and constructed and arranged to displace the output means through a distance much greater than the displacement of said movable piece incident to change of volume of said cell; and
fourth means, comprising electrical indicator means connected to and operable by said output means, constructed and arranged to provide accurate electrical indications of the extent of displacements of said output means, whereby said electrical indications are accurate representations of the change of volume of said cell and of the variations of the differences between the pressures exhibited on said interior and exterior surfaces of said cell.

7. A transducer according to claim 6, said positive displacement-amplifying means comprising first and second elongate spring limbs and means rigidly interconnecting convergent ends thereof, said input means comprising the divergent end portion of one of said spring limbs, said output means comprising the means interconnecting the convergent ends of said spring limbs, and means for holding the divergent end of the other of said spring limbs adjustably fixed in position.

8. A transducer as defined by claim 6, said electrical indicator means comprising a potentiometer contact connected to and operated by said output means and a potentiometer resistance element secured to said first means and constructed and arranged to be brushed by said contact incident to displacement of said output means.

9. A transducer as defined by claim 6, said third means comprising a pressure-sensitive cell arranged for expansion and contraction incident to increase and decrease, respectively, of pressure of fluid admitted thereto, and means for admitting fluid under pressure thereto, and attaching means connecting said pressure-sensitive cell to said displacement-amplifying means, said third means being constructed and arranged to vary the amplification factor of said displacement-amplifying means in response to movement of said attaching means incident to change of pressure of fluid admitted to said pressure-sensitive cell.

10. A pressure transducer comprising:
first means, comprising casing means, constructed and arranged to provide a sealed chamber and including provisions for introduction of fluid under pressure into said chamber and for exit of such fluid therefrom;
second means, comprising a first rectilinearly expansible and contractible resilient cell affixed in said chamber and provisions for withdrawal and introduction of fluid from and to said cell, whereby a movable part of said second means is rectilinearly displaced incident to change of pressure of fluid within said cell relative to that of fluid in said chamber;
third means, comprising a second rectilinearly expansible and contractible resilient cell affixed in said chamber and arranged with its line of expansion and contraction substantially perpendicular to that of said first resilient cell, and means for admitting fluid to the interior of said second cell to vary the expansion thereof;
fourth means, comprising motion-multiplier means connected to and supported by said second means and said third means, constructed and arranged to amplify displacement of said movable part to an extent dependent upon the extent of expansion of said second resilient cell and having an output means moved in accord with the amplified displacements; and
fifth means, comprising electrical indicator means, connected to said output means for actuation thereby, constructed and arranged to produce electrical indications of the displacements of said output means, whereby said electrical signals are representative of the expansion and contraction of said first resilient cell, as modified by rectilinear displacements of said second resilient cell.

11. A pressure transducer as defined by claim 10, said motion-multiplier means comprising a bifurcate device having first and second spring limbs and a bridge means interconnecting the limbs adjacent one end of each thereof and said first and second limbs being divergent away from said bridge means, and comprising means attaching a portion of the divergent end of a first one of said limbs to said first resilient cell and means attaching a portion of the divergent end of the other of said spring limbs to said second resilient cell for lateral movement thereby relative to said first spring limb.

12. A pressure transducer as defined by claim 11, said indicator means comprising a potentiometer including a contact and a resistance element, said contact being carried by said bridge means and said resistance element being supported by said first means in position to be brushed by said contact, and said fifth means comprising insulated terminals and connection for said contact and said resistance element.

References Cited in the file of this patent

UNITED STATES PATENTS

| | | | |
|---|---|---|---|
| 2,542,717 | Smith | Feb. 20, | 1951 |
| 2,973,496 | Gibbs | Feb. 28, | 1961 |